(12) United States Patent
Nakatsuka

(10) Patent No.: US 11,836,403 B2
(45) Date of Patent: Dec. 5, 2023

(54) SCHEDULE ADJUSTMENT APPARATUS AND IMAGE FORMING SYSTEM CAPABLE OF ADJUSTING MAINTENANCE SCHEDULE OF IMAGE FORMING APPARATUS

(71) Applicant: KYOCERA Document Solutions Inc., Osaka (JP)

(72) Inventor: Shinji Nakatsuka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/822,071

(22) Filed: Aug. 24, 2022

(65) Prior Publication Data
US 2023/0064640 A1 Mar. 2, 2023

(30) Foreign Application Priority Data
Aug. 25, 2021 (JP) ................. 2021-137451

(51) Int. Cl.
*G06F 3/12* (2006.01)
(52) U.S. Cl.
CPC .......... *G06F 3/1229* (2013.01); *G06F 3/1208* (2013.01); *G06F 3/1253* (2013.01)
(58) Field of Classification Search
None
See application file for complete search history.

(56) References Cited

U.S. PATENT DOCUMENTS

| | | | | |
|---|---|---|---|---|
| 2015/0277817 A1* | 10/2015 | Tsujioka | ............... | G06F 3/1289 358/1.14 |
| 2018/0059996 A1* | 3/2018 | Ishizu | ................... | G06F 3/1235 |
| 2019/0199863 A1* | 6/2019 | Zakharov | ........... | H04N 1/00068 |
| 2019/0377528 A1* | 12/2019 | Hotokeishi | ........... | G06F 3/1263 |
| 2020/0013158 A1* | 1/2020 | Asai | ...................... | G06T 7/0002 |
| 2020/0042258 A1* | 2/2020 | Kusakabe | ............. | G06F 3/1206 |
| 2021/0208825 A1* | 7/2021 | Hirabayashi | .......... | G06F 3/1229 |

FOREIGN PATENT DOCUMENTS

| | | | |
|---|---|---|---|
| JP | 2015170200 A | | 9/2015 |
| JP | 2015219801 A | * | 12/2015 |

* cited by examiner

*Primary Examiner* — Henok Shiferaw
(74) *Attorney, Agent, or Firm* — Alleman Hall Creasman & Tuttle LLP

(57) ABSTRACT

A schedule adjustment apparatus includes a storage portion, an acquisition portion, and an adjustment portion. The storage portion stores a schedule for giving an instruction to perform maintenance of the image forming apparatus. The acquisition portion acquires, from the image forming apparatus, state information indicating a state of an image formed on a sheet by the image forming apparatus. The adjustment portion adjusts the schedule based on the state information.

6 Claims, 5 Drawing Sheets

FIG.2a

```
                                SC, SC1
        ┌─────────────────────┐
        │ JULY 1   8:00~      │
        │ JULY 3   8:00~      │
        │ JULY 5   8:00~      │
        │        ⋮             │
        └─────────────────────┘
```

FIG.2b

```
                                SC, SC2
        ┌─────────────────────┐
        │ JULY 1   8:00~      │
        │ JULY 2   8:00~      │
        │ JULY 3   8:00~      │
        │        ⋮             │
        └─────────────────────┘
```

FIG.2c

```
                                SC, SC3
        ┌─────────────────────┐
        │ JULY 1   8:00~      │
        │ JULY 3   20:00~     │
        │ JULY 6   8:00~      │
        │        ⋮             │
        └─────────────────────┘
```

SCHEDULE ADJUSTMENT APPARATUS AND IMAGE FORMING SYSTEM CAPABLE OF ADJUSTING MAINTENANCE SCHEDULE OF IMAGE FORMING APPARATUS

INCORPORATION BY REFERENCE

This application is based upon and claims the benefit of priority from the corresponding Japanese Patent Application No. 2021-137451 filed on Aug. 25, 2021, the entire contents of which are incorporated herein by reference.

BACKGROUND

The present disclosure relates to a schedule adjustment apparatus and an image forming system.

A failure prediction system including a server having a schedule management portion, a prediction portion, an image analysis portion, and a communication portion is known. The schedule management portion determines an output method as to when and what kind of test image is to be output at an image forming apparatus. The communication portion notifies the image forming apparatus of a schedule according to the output method. A screen display portion of the image forming apparatus displays an output of a test image in accordance with the schedule. In response to the display, the user gives an output instruction. The user scans the test image output at the image forming apparatus and transmits the scanned test image to the server. The image analysis portion of the server analyzes the test image transmitted from the image forming apparatus. The prediction portion uses the analysis result of the image analysis portion to calculate an evaluation value representing the risk of failure for each test image. Then, the schedule management portion determines an output method again based on the evaluation value.

SUMMARY

A schedule adjustment apparatus according to an aspect of the present disclosure includes a storage portion, an acquisition portion, and an adjustment portion. The storage portion stores a schedule for giving an instruction to perform maintenance of the image forming apparatus. The acquisition portion acquires, from the image forming apparatus, state information indicating a state of an image formed on a sheet by the image forming apparatus. The adjustment portion adjusts the schedule based on the state information.

An image forming system according to another aspect of the present disclosure includes an image forming apparatus and a schedule adjustment apparatus. The image forming apparatus includes an image forming portion, a state detection portion, and a transmission portion. The image forming portion forms an image on a sheet. The state detection portion detects a state of the image formed on the sheet and generates state information indicating the state of the image. The transmission portion transmits the state information to the schedule adjustment apparatus. The schedule adjustment apparatus includes a storage portion, an acquisition portion, and an adjustment portion. The storage portion stores a schedule for giving an instruction to perform maintenance of the image forming apparatus. The acquisition portion acquires the state information from the image forming apparatus. The adjustment portion adjusts the schedule based on the state information.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2($a$) is a diagram showing a schedule stored in a storage portion of a server according to the first embodiment.

FIG. 2($b$) is a diagram showing an example of a schedule adjusted by an adjustment portion of the server according to the first embodiment.

FIG. 2($c$) is a diagram showing another example of the schedule adjusted by the adjustment portion of the server according to the first embodiment.

DETAILED DESCRIPTION

Figure 1:
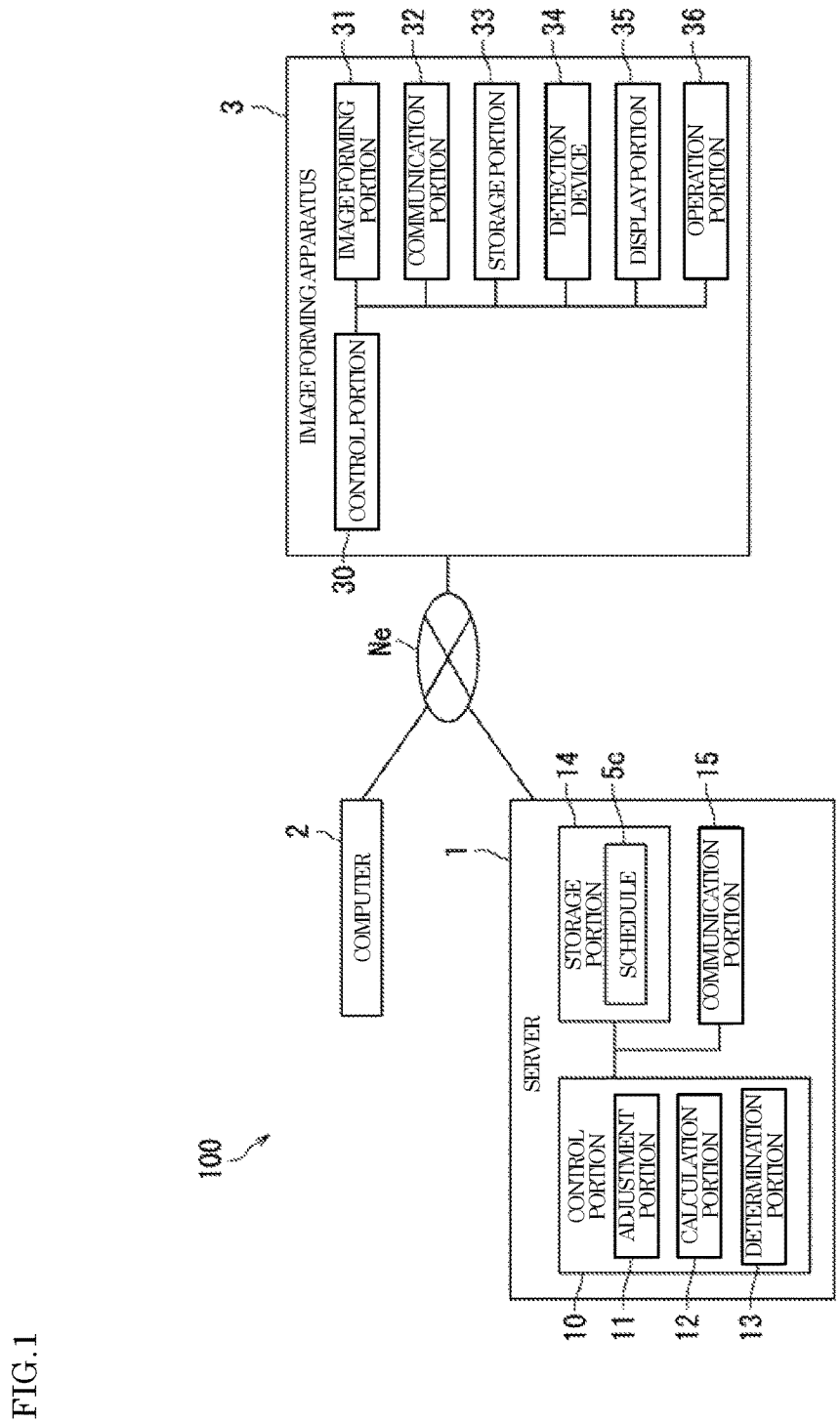
FIG. 1 is a block diagram showing a configuration of an image forming system according to a first embodiment of the present disclosure.

Embodiments of the present disclosure will be described below with reference to the drawings. However, the present disclosure is not limited to the following embodiments. In the drawings, the same or corresponding portions are denoted by the same reference numerals, and descriptions thereof will not be repeated.

First Embodiment

First, an image forming system 100 will be described with reference to FIG. 1. FIG. 1 is a block diagram showing a configuration of the image forming system 100. As shown in FIG. 1, the image forming system 100 includes a server 1 and an image forming apparatus 3. In the first embodiment, the image forming system 100 further includes a computer 2. In addition, in the first embodiment, the server 1 is an example of a "schedule adjustment apparatus".

The server 1 is connected to each of the computer 2 and the image forming apparatus 3 via a network Ne. The network Ne is, for example, the Internet, a local area network (LAN), or a wide area network (WAN). In addition, the computer 2 is connected to the image forming apparatus 3 via the network Ne.

The computer 2 is, for example, a personal computer. The user of the computer 2 operates the computer 2 to generate a print job, and transmits the generated print job to the server 1.

The server 1 executes a schedule adjustment process. The server 1 executes the schedule adjustment process to adjust a schedule SC for giving an instruction to perform maintenance of the image forming apparatus 3. Details of the schedule adjustment process will be described later. The server 1 includes a control portion 10, a storage portion 14, and a communication portion 15.

The storage portion 14 includes a storage device and stores computer programs, such as software, and data. Specifically, the storage portion 14 includes a main storage device, such as a semiconductor memory, and an auxiliary storage device, such as a semiconductor memory, a solid state drive, and/or a hard disk drive. The auxiliary storage device includes, for example, a non-volatile memory. The non-volatile memory is, for example, an electrically erasable programmable read-only memory (EEPROM). The storage portion 14 may include a removable medium. In addition, in the first embodiment, the storage portion 14 stores the schedule SC for giving an instruction to perform maintenance of the image forming apparatus 3. The maintenance of the image forming apparatus 3 will be described later.

There is known a failure prediction system including a server having a schedule management portion, a prediction portion, an image analysis portion, and a communication portion. The schedule management portion determines an output method as to when and what kind of test image is to be output at an image forming apparatus. The communication portion notifies the image forming apparatus of a schedule according to the output method. A screen display portion of the image forming apparatus displays an output of a test image in accordance with the schedule. In response to the display, the user gives an output instruction. The user scans the test image output at the image forming apparatus and transmits the scanned test image to the server. The image analysis portion of the server analyzes the test image transmitted from the image forming apparatus. The prediction portion uses the analysis result of the image analysis portion to calculate an evaluation value representing the risk of failure for each test image. Then, the schedule management portion determines an output method again based on the evaluation value.

In the above-described failure prediction system, failure prediction of an image forming apparatus is performed. However, in the above-described failure prediction system, it is necessary for the user to adjust the maintenance schedule of the image forming apparatus based on the failure prediction, which is troublesome for the user.

On the other hand, the image forming system 100 according to the first embodiment of the present disclosure can appropriately adjust the maintenance schedule of the image forming apparatus 3, as will be described below.

The control portion 10 includes a processor such as a central processing unit (CPU). The control portion 10 controls each element of the server 1. Specifically, the control portion 10 controls the storage portion 14 and the communication portion 15 by executing computer programs stored in the storage device of the storage portion 14.

In addition, the processor of the control portion 10 functions as an adjustment portion 11, a calculation portion 12, and a determination portion 13 by executing computer programs stored in the storage device of the storage portion 14. That is, the control portion 10 includes the adjustment portion 11, the calculation portion 12, and the determination portion 13.

The adjustment portion 11 adjusts the schedule SC. That is, the adjustment portion 11 adjusts the schedule SC for the server 1 to give an instruction to perform maintenance of the image forming apparatus 3. The adjustment of the schedule SC will be described later.

The calculation portion 12 calculates a time period during which the image forming apparatus 3 forms an image on a sheet. Specifically, based on a print job transmitted from the computer 2, the calculation portion 12 calculates a time period during which the image forming apparatus 3 executes the print job and forms an image on a sheet.

Based on the calculation result of the calculation portion 12, the determination portion 13 determines whether or not the time period during which the image forming apparatus 3 forms an image on a sheet overlaps with the timing of an instruction to perform maintenance of the image forming apparatus 3. Accordingly, when the time period during which the image forming apparatus 3 forms an image on a sheet based on a print job overlaps with the timing of an instruction to perform maintenance of the image forming apparatus 3, it is possible to allow the user to select which of the formation of an image on a sheet and the maintenance of the image forming apparatus 3 should be given priority. As a result, downtime caused by interrupting the formation of an image on a sheet for maintenance of the image forming apparatus 3 when the image forming apparatus 3 is forming an image on a sheet, i.e., when the image forming apparatus 3 is executing a print job, can be suppressed.

The communication portion 15 is connected to the network Ne. The network Ne includes, for example, the Internet, a local area network (LAN), and a public telephone network. The communication portion 15 includes, for example, a network interface controller (NIC) that performs communication in accordance with a predetermined communication protocol. The predetermined communication protocol is, for example, the Transmission Control Protocol/Internet Protocol (TCP/IP) protocol suite (i.e., the Internet protocol suite).

In the first embodiment, the communication portion 15 is controlled by the control portion 10 to transmit a print job transmitted from the computer 2 to the image forming apparatus 3. In addition, the communication portion 15 is controlled by the control portion 10 based on the schedule SC to transmit an instruction to perform maintenance of the image forming apparatus 3 to the image forming apparatus 3. In addition, the communication portion 15 receives state information SI from the image forming apparatus 3. Details of the state information SI will be described later. The communication portion 15 is an example of an "acquisition portion" and is also an example of a "transmission portion".

The image forming apparatus 3 is operated by, for example, a user (sometimes referred to as a machine operator). In addition, the image forming apparatus 3 is maintained by the user. Specifically, the user performs maintenance of the image forming apparatus 3 in accordance with a maintenance instruction transmitted from the server 1. In addition, the image forming apparatus 3 is replenished with sheets by the user. It is noted that the user of the image forming apparatus 3 and the user of the computer 2 may be the same or different. In addition, the user who operates the image forming apparatus 3, the user who performs maintenance of the image forming apparatus 3, and the user who replenishes the image forming apparatus 3 with sheets may be the same or different.

The maintenance of the image forming apparatus 3 includes, for example, drive voltage adjustment, non-discharge nozzle correction, purging, and belt meandering correction. Execution of drive voltage adjustment can, for example, suppress the occurrence of an uneven colored image. In addition, execution of non-discharge nozzle correction or purging can, for example, suppress generation of a streak image. Further, execution of the belt meandering correction can, for example, suppress generation of a color shift image.

The image forming apparatus 3 includes a control portion 30, an image forming portion 31, a communication portion 32, a storage portion 33, a detection device 34, a display portion 35, and an operation portion 36.

The configuration of the storage portion 33 is the same as that of the storage portion 14 of the server 1. The storage portion 33 stores computer programs, such as software, and data.

The control portion 30 includes a processor such as a CPU. The control portion 30 controls each element of the image forming apparatus 3. Specifically, the control portion 30 executes computer programs stored in the storage portion 33 to control the image forming portion 31, the communication portion 32, the storage portion 33, the detection device 34, the display portion 35, and the operation portion 36.

The image forming portion 31 executes a print job. Specifically, the image forming portion 31 forms an image on a sheet using toner or ink, based on a print job transmitted from the server 1 and received by the communication portion 32. For example, the image forming portion 31 forms an image on a sheet by an electrophotographic method. Specifically, the image forming portion 31 includes a photoconductor drum, a charging device, an exposure device, a developing device, a transfer device, a cleaning device, a static eliminator, and a fixing device. The charging device charges the photoconductor drum to a predetermined potential. The exposure device outputs laser light based on image data to expose the photoconductor drum, thereby forming an electrostatic latent image corresponding to the image data on the photoconductor drum. The developing device supplies toner to the electrostatic latent image on the photoconductor drum to develop the electrostatic latent image, thereby forming a toner image on the photoconductor drum. The transfer device transfers the toner image on the photoconductor drum onto a sheet. The cleaning device removes residual toner remaining on the photoconductor drum after the transfer. The static eliminator removes static from the photoconductor drum after the transfer. The fixing device fixes the image, which is a toner image, on the sheet by applying pressure and heating. Alternatively, for example, the image forming portion 31 forms an image on a sheet by an inkjet method. That is, the image forming apparatus 3 may employ an electrophotographic method or an inkjet recording method.

The configuration of the communication portion 32 is the same as that of the communication portion 15 of the server 1. The communication portion 32 is connected to the network Ne. The communication portion 32 is controlled by the control portion 30 to transmit information indicating the execution status of the print job by the image forming portion 31 to the server 1. The server 1 transmits the information indicating the execution status of the print job received from the communication portion 32 to the computer 2. Then, the display portion of the computer 2 displays the execution status of the print job received from the server 1. As a result, the user of the computer 2 can confirm the execution status of the print job.

Upon completion of maintenance of the image forming apparatus 3, the user of the image forming apparatus 3 transmits a notice of completion of maintenance of the image forming apparatus 3 to the server 1 via the communication portion 32. Specifically, for example, when the user completes drive voltage adjustment of the image forming apparatus 3, the user transmits a notice of completion of drive voltage adjustment to the server 1 via the communication portion 32. The storage portion 14 of the server 1 stores the time when the server 1 receives the notice of completion of maintenance of the image forming apparatus 3.

The detection device 34 detects the state of the image formed on the sheet by the image forming portion 31 and generates state information SI indicating the state of the image. Specifically, the detection device 34 scans the sheet on which the image has been formed by the image forming portion 31. Next, the detection device 34 analyzes the state of the image formed on the sheet. Then, the detection device 34 generates state information SI based on the analysis result of the image. In the first embodiment, the state information SI is transmitted to the server 1 by the communication portion 32. The detection device 34 is an example of a "state detection portion".

In the first embodiment, the state information SI includes, for example, abnormality information AI indicating that the image is abnormal or normality information NI indicating that the image is normal. When the image formed on the sheet by the image forming portion 31 of the image forming apparatus 3 is abnormal, the state information SI includes the abnormality information AI. When the image formed on the sheet by the image forming portion 31 of the image forming apparatus 3 is normal, the state information SI includes the normality information NI. It is noted that the detection device 34 may analyze the image formed on the sheet and quantify the image formed on the sheet. For example, the detection device 34 may include the normality information NI in the state information SI when the quantified analysis result is equal to or greater than a predetermined threshold value, and include the abnormality information AI in the state information SI when the quantified analysis result is less than the predetermined threshold value.

The display portion 35 displays various kinds of screens. The display portion 35 is, for example, a display device such as a liquid crystal display or an organic electroluminescence (EL) display. For example, the display portion 35 displays an instruction to perform maintenance of the image forming apparatus 3 transmitted from the communication portion 15 of the server 1. Then, the user of the image forming apparatus 3 confirms the instruction displayed on the display portion 35 and performs maintenance of the image forming apparatus 3. It is noted that the display portion 35 shows specific maintenance details, for example, "Perform drive voltage adjustment". In addition, the display portion 35 may show the instruction to perform maintenance of the image forming apparatus 3 abstractly, for example, "Please perform maintenance of the image forming apparatus 3".

The operation portion 36 receives an operation from the user of the image forming apparatus 3, and inputs an operation signal corresponding to the user's operation to the control portion 30. The operation portion 36 is, for example, a touch panel including a display portion and a touch detection portion. The touch detection portion detects an operation by the user. In addition, the operation portion 36 may include one or more physical buttons, or may include a keyboard and/or a mouse.

Next, the schedule SC stored in the storage portion 14 of the server 1 will be described with reference to FIG. 1 and FIG. 2. FIG. 2(a) is a diagram showing the schedule SC stored in the storage portion 14. Specifically, FIG. 2(a) shows the default schedule SC stored in the storage portion 14. The default schedule SC is determined in accordance with, for example, abnormalities of the image forming apparatus 3 that occur when the image forming apparatus 3 is used in a general way. Hereinafter, the default schedule SC may be referred to as schedule SC1.

The storage portion 14 stores a timing of giving an instruction to maintain the image forming apparatus 3 in the schedule SC. Specifically, the schedule SC1 manages to have the server 1 to give an instruction to perform maintenance of the image forming apparatus 3 at eight o'clock every two days.

In the first embodiment, the adjustment portion 11 of the server 1 adjusts the schedule SC based on the state information SI. That is, the adjustment portion 11 adjusts the schedule SC based on the state information SI transmitted from the image forming apparatus 3. Accordingly, the timing of giving an instruction to perform maintenance can be advanced, delayed, or maintained depending on whether an unpredictable error (for example, generation of a uneven colored image) has occurred in the image forming apparatus 3, or an error predicted to occur has not occurred in the image forming apparatus 3. As a result, the maintenance schedule of the image forming apparatus 3 can be appropriately adjusted.

FIG. 2(b) is a diagram showing an example of the schedule SC adjusted by the adjustment portion 11 of the server 1. Specifically, FIG. 2(b) shows a schedule SC in which the timing of giving an instruction to perform maintenance in the schedule SC1 has been advanced by the adjustment portion 11. That is, the frequency of maintenance of the image forming apparatus 3 has been increased by the adjustment portion 11. Hereinafter, the schedule SC in which the timing of giving an instruction to perform maintenance has been advanced may be referred to as schedule SC2.

Specifically, for example, when the state information SI includes the abnormality information AI, the adjustment portion 11 advances or maintains the timing of giving an instruction to perform maintenance of the image forming apparatus 3. Accordingly, when the image formed on the sheet by the image forming apparatus 3 is abnormal, the timing of performing maintenance of the image forming apparatus 3 can be advanced or maintained. As a result, the maintenance schedule of the image forming apparatus 3 can be adjusted more appropriately.

In the example shown in FIG. 2(b), the schedule SC2 manages to have the server 1 to give an instruction to perform maintenance of the image forming apparatus 3 at eight o'clock every day. Accordingly, since the frequency of maintenance of the image forming apparatus 3 is higher than that in the default schedule SC1, an abnormality that occurs in the image forming apparatus 3 can be eliminated more quickly, and occurrence of an error in the image forming apparatus 3 can be suppressed.

Here, when the image formed on the sheet by the image forming apparatus 3 is abnormal, the adjustment portion 11 determines whether to advance or maintain the timing of performing maintenance of the image forming apparatus 3 based on, for example, whether or not a predetermined period has elapsed since the last transmission of an instruction to perform maintenance to the image forming apparatus 3. Specifically, for example, when the image formed on the sheet by the image forming apparatus 3 is abnormal and the predetermined period has elapsed since the last transmission of an instruction to perform maintenance to the image forming apparatus 3, the adjustment portion 11 advances the timing of performing maintenance of the image forming apparatus 3. In addition, for example, when the image formed on the sheet by the image forming apparatus 3 is abnormal and the predetermined period has not elapsed since the last transmission of an instruction to perform maintenance to the image forming apparatus 3, the adjustment portion 11 maintains the timing of performing maintenance of the image forming apparatus 3.

FIG. 2(c) shows another example of the schedule SC adjusted by the adjustment portion 11 of the server 1. Specifically, FIG. 2(c) shows a schedule SC in which the timing of giving an instruction to perform maintenance in the schedule SC1 has been delayed by the adjustment portion 11. That is, the frequency of maintenance of the image forming apparatus 3 has been decreased by the adjustment portion 11. Hereinafter, the schedule SC in which the timing of giving an instruction to perform maintenance has been delayed may be referred to as schedule SC3.

Specifically, for example, when the state information SI includes the normality information NI, the adjustment portion 11 delays or maintains the timing of giving an instruction to perform maintenance of the image forming apparatus 3. Accordingly, when the image formed on the sheet by the image forming apparatus 3 is normal, the timing of performing maintenance can be delayed or maintained. As a result, the maintenance schedule of the image forming apparatus 3 can be adjusted more appropriately.

In the example shown in FIG. 2(c), the schedule SC3 manages to have the server 1 to give an instruction to perform maintenance of the image forming apparatus 3 every one and a half days. Accordingly, since the frequency of maintenance of the image forming apparatus 3 is lower than that in the default schedule SC1, unnecessary maintenance of the image forming apparatus 3 can be suppressed.

Here, when the image formed on the sheet by the image forming apparatus 3 is normal, the adjustment portion 11 determines whether to delay or maintain the timing of performing maintenance of the image forming apparatus 3 based on, for example, whether or not the predetermined period has elapsed since the last transmission of an instruction to perform maintenance to the image forming apparatus 3. Specifically, for example, when the image formed on the sheet by the image forming apparatus 3 is normal and the predetermined period has elapsed since the last transmission of an instruction to perform maintenance to the image forming apparatus 3, the adjustment portion 11 delays the timing of performing maintenance of the image forming apparatus 3. In addition, for example, when the image formed on the sheet by the image forming apparatus 3 is normal and the predetermined period has not elapsed since the last transmission of an instruction to perform maintenance to the image forming apparatus 3, the adjustment portion 11 maintains the timing of performing maintenance of the image forming apparatus 3.

In addition, in the first embodiment, the adjustment portion 11 adjusts the schedule SC according to the use situation of the image forming apparatus 3. Specifically, the adjustment portion 11 adjusts the schedule SC in accordance with, for example, the printing amount (number of printed sheets) of the image forming apparatus 3 and the room temperature and/or humidity around the image forming apparatus 3. As a result, the maintenance schedule SC of the image forming apparatus 3 can be adjusted more appropriately in accordance with the use situation of the image forming apparatus 3.

Next, with continued reference to FIG. 1 and FIG. 2, a case where the time period during which an image is formed on a sheet by the image forming apparatus 3 overlaps with the timing of giving an instruction to perform maintenance of the image forming apparatus 3 will be described. As described above with reference to FIG. 1, in the first embodiment, the calculation portion 12 of the server 1 calculates, based on a print job transmitted from the computer 2, the time period during which the image forming apparatus 3 executes the print job and forms an image on a sheet. Then, the determination portion 13 determines, based on the calculation result of the calculation portion 12, whether or not the time period during which the image forming apparatus 3 forms the image on the sheet overlaps the timing of giving an instruction to perform maintenance of the image forming apparatus 3.

For example, when the schedule SC1 shown in FIG. 2(a) is the schedule SC stored in the storage portion 14 and the calculation result of the calculation portion 12 indicates that the time period during which the image forming apparatus 3 executes a print job and forms an image on a sheet is from 7:30 on July 1 to 8:30 on July 1, the determination portion 13 determines that the time period during which the image forming apparatus 3 forms the image on the sheet overlaps with the timing of giving an instruction to perform maintenance of the image forming apparatus 3. When the determination portion 13 determines that the time period during which the image forming apparatus 3 forms an image on a sheet overlaps with the timing of giving an instruction to perform maintenance of the image forming apparatus 3, the control portion 10 controls the communication portion 15 to transmit the determination result of the determination portion 13 to the image forming apparatus 3. That is, the communication portion 15 transmits the determination result of the determination portion 13 to the image forming apparatus 3. In the first embodiment, the determination result of the determination portion 13 includes information for asking the user which of the formation of an image on a sheet and the maintenance of the image forming apparatus 3 has priority. That is, the communication portion 15 transmits to the image forming apparatus 3 information for asking the user which of the formation of an image on a sheet and the maintenance of the image forming apparatus 3 has priority.

When the image forming apparatus 3 receives the information for asking the user which of the formation of an image on a sheet and the maintenance of the image forming apparatus 3 has priority, the control portion 30 causes the display portion 35 of the image forming apparatus 3 to display the information and the determination result of the determination portion 13. It is noted that the display portion 35 may display information for asking the user which of the formation of an image on a sheet and the maintenance of the image forming apparatus 3 has priority, and may not display the determination result of the determination portion 13.

Then, the user of the image forming apparatus 3 operates the operation portion 36 to transmit to the server 1 a reply indicating which of the formation of an image on a sheet and the maintenance of the image forming apparatus 3 has priority. The communication portion 15 of the server 1 receives a user's instruction based on the determination result of the determination portion 13 transmitted from the image forming apparatus 3. Then, the adjustment portion 11 adjusts the schedule SC based on the user's instruction. Accordingly, when the time period during which the image forming apparatus 3 forms an image on a sheet overlaps with the timing of performing maintenance of the image forming apparatus 3, the user can select which of the formation of an image on a sheet and the maintenance has priority. As a result, the maintenance schedule of the image forming apparatus 3 can be adjusted in accordance with the user's preference.

Specifically, for example, when the user gives an instruction to give priority to the formation of an image on a sheet, the server 1 receives from the image forming apparatus 3 information indicating that the formation of an image on a sheet has priority. The adjustment portion 11 adjusts the schedule SC based on the information indicating that the formation of an image on a sheet has priority received from the image forming apparatus 3, and adjusts the timing of causing the server 1 to give an instruction to perform maintenance of the image forming apparatus 3 to a timing after the formation of the image on the sheet is completed. Then, the communication portion 15 transmits the print job to the image forming apparatus 3, and the image forming apparatus 3 forms an image on a sheet based on the print job.

On the other hand, for example, when the user gives an instruction to give priority to the maintenance of the image forming apparatus 3, the server 1 receives from the image forming apparatus 3 information indicating that the maintenance of the image forming apparatus 3 has priority. Based on the information indicating that the maintenance of the image forming apparatus 3 has priority received from the image forming apparatus 3, the adjustment portion 11 adjusts the schedule SC, i.e., maintains the schedule SC, and transmits an instruction to perform maintenance of the image forming apparatus 3 to the image forming apparatus 3. Then, the user performs maintenance of the image forming apparatus 3 based on the instruction displayed on the display portion 35.

Figure 3:
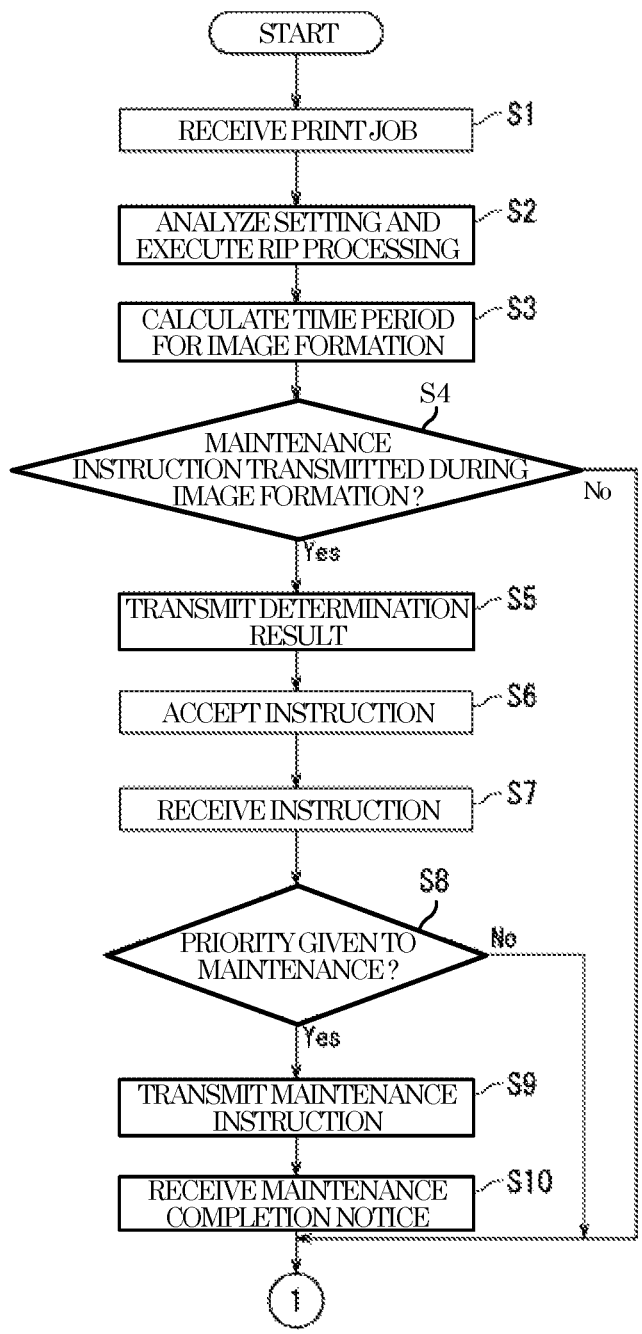
FIG. 3 is a flowchart showing the first half stage of a schedule adjustment process executed by the server according to the first embodiment.

Next, the schedule adjustment process executed by the server 1 will be described with reference to FIG. 1 and FIG. 3. FIG. 3 is a flowchart showing the first half stage of the schedule adjustment process executed by the server 1.

In step S1, the communication portion 15 of the server 1 receives a print job from the computer 2.

In step S2, the control portion 10 of the server 1 analyzes the setting of the print job received in step S1 and executes raster image processor (RIP) processing.

In step S3, the calculation portion 12 calculates a time period during which the image forming apparatus 3 forms an image on a sheet based on the print job.

In step S4, the determination portion 13 determines, based on the calculation result of the calculation portion 12 in step S3, whether or not the time period during which the image forming apparatus 3 forms the image on the sheet overlaps with the timing of giving an instruction to perform maintenance of the image forming apparatus 3. That is, the determination portion 13 determines whether or not an instruction to perform maintenance of the image forming apparatus 3 is transmitted to the image forming apparatus 3 while the image forming apparatus 3 forms the image on the sheet. When a positive determination (Yes) is made in step S4, the process proceeds to step S5. On the other hand, when a negative determination (No) is made in step S4, the process proceeds to step S21 in FIG. 4.

In step S5, the control portion 10 controls the communication portion 15 to transmit the determination result in step S4 to the image forming apparatus 3. As a result, the communication portion 15 transmits the determination result in step S4 to the image forming apparatus 3. In addition, the communication portion 15 transmits to the image forming apparatus 3 information for asking the user which of the formation of the image on the sheet and the maintenance of the image forming apparatus 3 has priority.

In step S6, the control portion 30 of the image forming apparatus 3 receives a user's instruction based on the determination result accepted in step S5. Then, the communication portion 32 of the image forming apparatus 3 transmits the user's instruction accepted by the control portion 30 to the server 1.

In step S7, the communication portion 15 receives the user's instruction accepted by the image forming apparatus 3 in step S6. As a result, the control portion 10 accepts the user's instruction indicating which of the formation of the image on the sheet and the maintenance of the image forming apparatus 3 has priority.

In step S8, the control portion 10 determines whether or not the user's instruction accepted in step S7 indicates that the maintenance of the image forming apparatus 3 has priority over the formation of the image on the sheet. When a positive determination (Yes) is made in step S8, the process proceeds to step S9. On the other hand, when a negative determination (No) is made in step S8, the process proceeds to step S21 in FIG. 4.

In step S9, the control portion 10 controls the communication portion 15 to transmit an instruction to perform maintenance of the image forming apparatus 3 to the image forming apparatus 3. As a result, the communication portion 15 transmits an instruction to perform maintenance of the image forming apparatus 3 to the image forming apparatus 3.

In step S10, in response to the completion of the maintenance of the image forming apparatus 3, the user of the image forming apparatus 3 operates the operation portion 36 to transmit a notice of completion of maintenance of the image forming apparatus 3 to the server 1 via the communication portion 32. As a result, the communication portion 15 of the server 1 receives the notice of completion of maintenance of the image forming apparatus 3. Then, the process proceeds to step S21 in FIG. 4.

Figure 4:
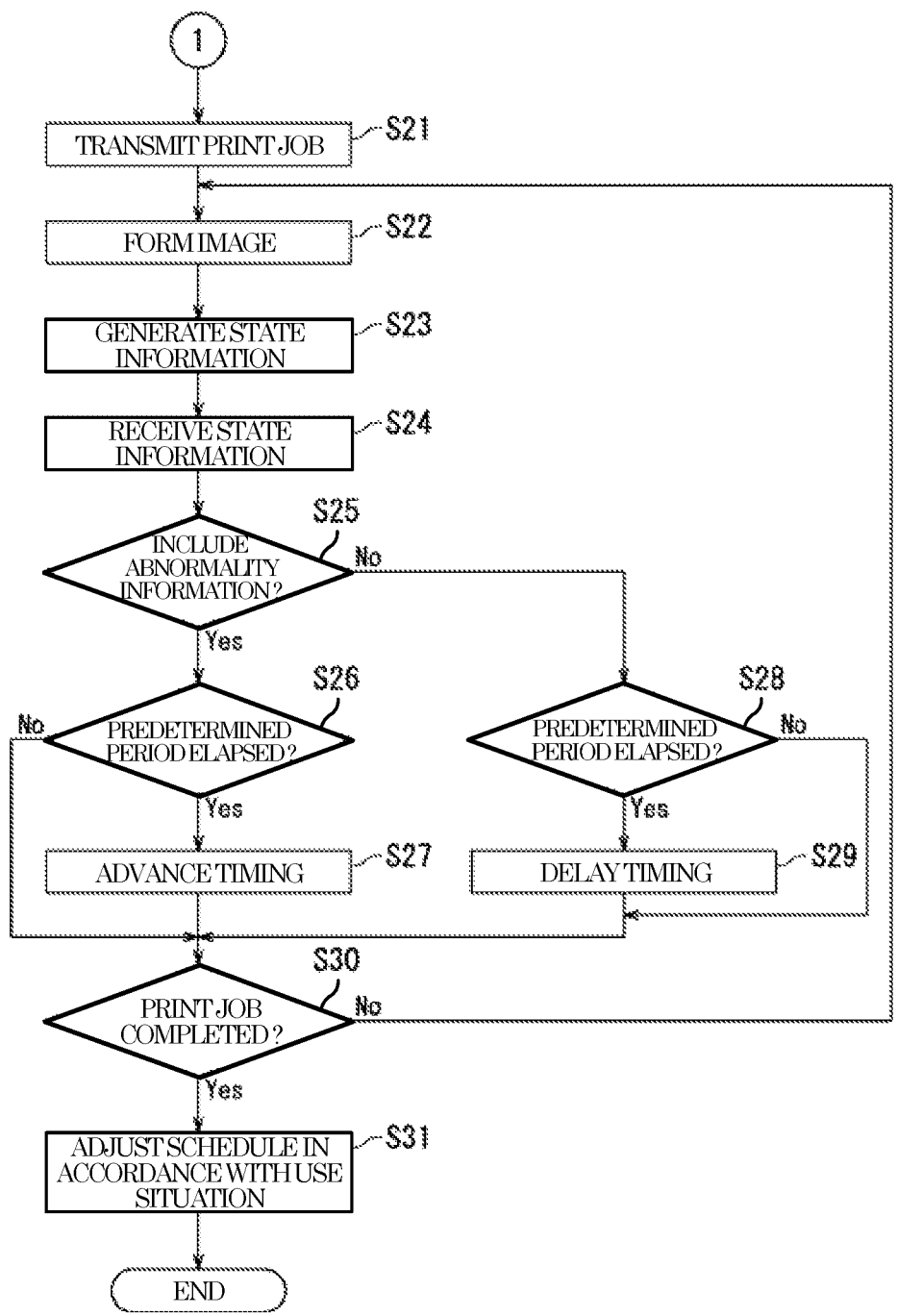
FIG. 4 is a flowchart showing the latter half stage of the schedule adjustment process executed by the server according to the first embodiment.

As shown in FIG. 4, in step S21, the control portion 10 controls the communication portion 15 to transmit the print job to the image forming apparatus 3. As a result, the communication portion 15 transmits the print job to the image forming apparatus 3.

In step S22, the image forming portion 31 of the image forming apparatus 3 forms an image on a sheet based on the print job transmitted in step S21.

In step S23, the detection device 34 of the image forming apparatus 3 detects the state of the image formed on the sheet in step S22 and generates state information SI indicating the state of the image. Then, the control portion 30 of the image forming apparatus 3 controls the communication portion 32 to transmit the state information SI generated by the detection device 34 to the server 1. As a result, the communication portion 32 transmits the state information SI generated by the detection device 34 to the server 1.

In step S24, the communication portion 15 receives the state information SI transmitted from the image forming apparatus 3.

In step S25, the adjustment portion 11 determines whether or not the state information SI received in step S24 includes abnormality information AI. When a positive determination (Yes) is made in step S25, the process proceeds to step S26. On the other hand, when a negative determination (No) is made in step S25, the process proceeds to step S28.

In step S26, the adjustment portion 11 determines whether or not a predetermined period has elapsed since the last transmission of a maintenance instruction to the image forming apparatus 3. When a positive determination (Yes) is made in step S26, the process proceeds to step S27. In step S27, the adjustment portion 11 advances the timing of giving an instruction to perform maintenance of the image forming apparatus 3. Then, the process proceeds to step S30. On the other hand, when a negative determination (No) is made in step S26, the process proceeds to step S30. That is, the adjustment portion 11 maintains the timing of giving an instruction to perform maintenance of the image forming apparatus 3.

In step S28, the adjustment portion 11 determines whether or not a predetermined period has elapsed since the last transmission of a maintenance instruction to the image forming apparatus 3. When a positive determination (Yes) is made in step S28, the process proceeds to step S29. In step S29, the adjustment portion 11 delays the timing of giving an instruction to perform maintenance of the image forming apparatus 3. Then, the process proceeds to step S30. On the other hand, when a negative determination (No) is made in step S28, the process proceeds to step S30. That is, the adjustment portion 11 maintains the timing of giving an instruction to perform maintenance of the image forming apparatus 3.

In step S30, the control portion 10 determines whether or not the image forming apparatus 3 has completed the print job. Specifically, for example, the control portion 10 determines whether or not the communication portion 15 has received a notice of completion of the print job from the image forming apparatus 3. When a positive determination (Yes) is made in step S30, the process proceeds to step S31. On the other hand, when a negative determination (No) is made in step S30, the process proceeds to step S22.

In step S31, the adjustment portion 11 adjusts the schedule SC in accordance with the use situation of the image forming apparatus 3. Then, the schedule adjustment process executed by the server 1 is completed.

Second Embodiment

Next, a schedule adjustment process executed by the server 1 (schedule adjustment apparatus) according to the second embodiment of the present disclosure will be described with reference to FIG. 1, FIG. 4, and FIG. 5. The second embodiment is different from the first embodiment in that the adjustment portion 11 adjusts the schedule SC without receiving an instruction from the user when the time period during which the image forming apparatus 3 forms an image on a sheet overlaps with the timing of instructing the image forming apparatus 3 to perform maintenance in the second embodiment. Hereinafter, matters different from the first embodiment will be described with respect to the second embodiment, and descriptions of portions overlapping with the first embodiment will be omitted.

In the second embodiment, the determination portion 13 determines, based on the calculation result of the calculation portion 12, whether or not the time period during which the image forming apparatus 3 forms an image on a sheet overlaps with the timing of giving an instruction to perform maintenance of the image forming apparatus 3. When the time period during which the image forming apparatus 3 forms an image on a sheet based on a print job overlaps with the timing of an instruction to perform maintenance of the image forming apparatus 3, the adjustment portion 11 adjusts the schedule SC for giving an instruction to perform maintenance of the image forming apparatus 3. Accordingly, it is possible to form an image on a sheet prior to maintenance of the image forming apparatus 3 or to execute maintenance of the image forming apparatus 3 prior to formation of an image on a sheet without receiving an instruction from the user. As a result, the user can reduce the time and effort required to give an instruction to the image forming apparatus 3. The user can also reduce the amount of time to think to give an instruction.

Specifically, for example, when the time period during which the image forming apparatus 3 forms an image on a sheet overlaps with the timing of giving an instruction to perform maintenance of the image forming apparatus 3, the calculation portion 12 calculates how much the execution of the print job is to be completed by the timing of giving an instruction to perform maintenance of the image forming apparatus 3. Based on the calculation result of the calculation portion 12, the adjustment portion 11 determines whether or not the print job is completed by a predetermined ratio or more by the timing of giving an instruction to perform maintenance of the image forming apparatus 3. When the print job is completed by the predetermined ratio or more by the timing of giving an instruction to perform maintenance of the image forming apparatus 3, the adjustment portion 11 delays the timing of giving an instruction to perform maintenance of the image forming apparatus 3 to give priority to, for example, the formation of an image on a sheet over the maintenance of the image forming apparatus 3. When the print job is completed by less than the predetermined ratio by the timing of giving an instruction to perform maintenance of the image forming apparatus 3, the adjustment portion 11 advances the timing of giving an instruction to perform maintenance of the image forming apparatus 3 to give priority to, for example, the maintenance of the image forming apparatus 3 over the formation of an image on a sheet.

Figure 5:
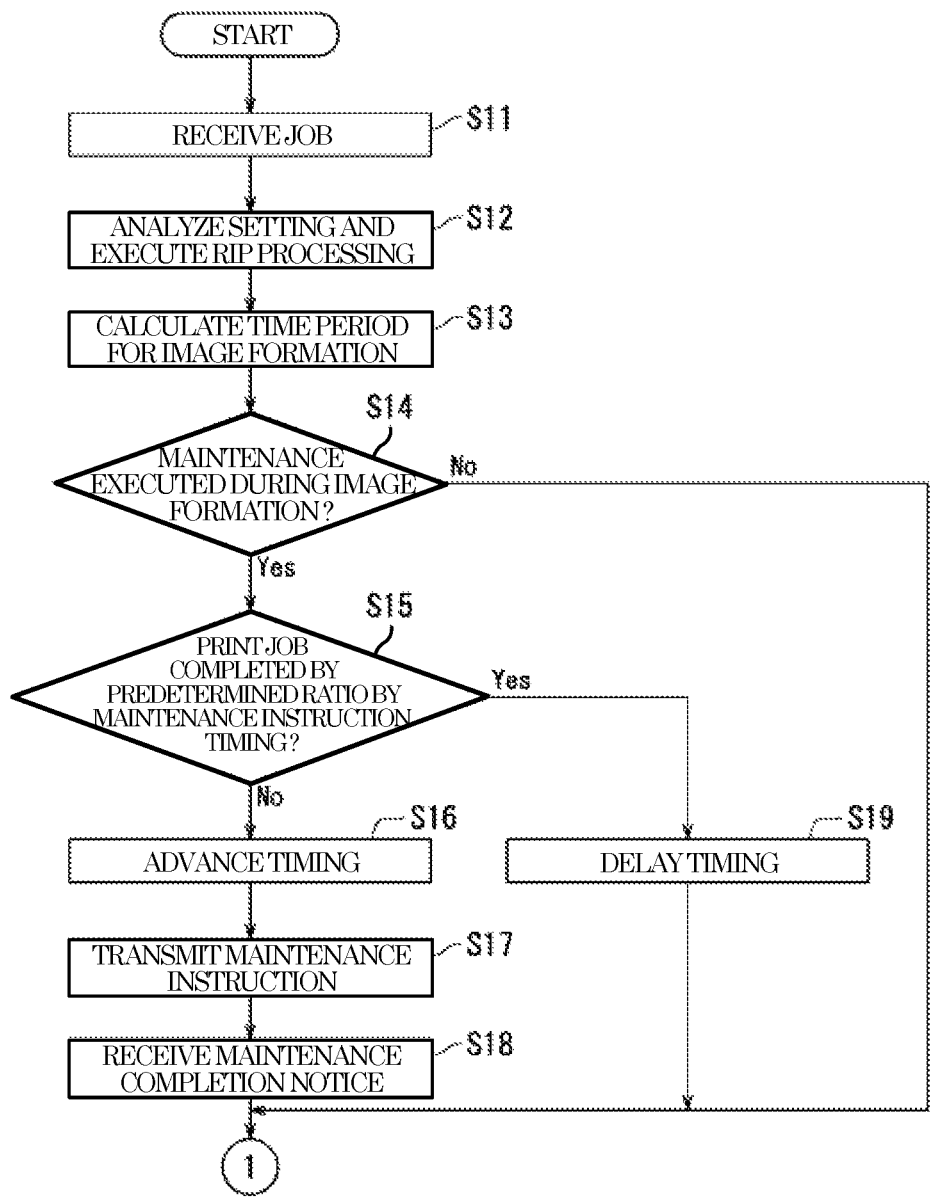
FIG. 5 is a flowchart showing the first half stage of a schedule adjustment process executed by a server according to a second embodiment of the present disclosure.

FIG. 5 shows the first half stage of the schedule adjustment process executed by the server 1 according to the second embodiment. Since the processing of step S11 to step S13 is the same as the processing of step S1 to step S3 described with reference to FIG. 3, descriptions thereof will be omitted. In addition, since the latter half stage of the schedule adjustment process executed by the server 1 according to the second embodiment is the same as the processing described with reference to FIG. 4, descriptions thereof will be omitted.

In step S14, the determination portion 13 determines, based on the calculation result of the calculation portion 12 in step S13, whether or not the time period during which the image forming apparatus 3 forms an image on a sheet overlaps with the timing of giving an instruction to perform maintenance of the image forming apparatus 3. That is, the determination portion 13 determines whether or not an instruction to perform maintenance of the image forming apparatus 3 is transmitted to the image forming apparatus 3 while the image forming apparatus 3 forms the image on the sheet. When a positive determination (Yes) is made in step S14, the process proceeds to step S15. On the other hand, when a negative determination (No) is made in step S14, the process proceeds to step S21 in FIG. 4.

In step S15, the calculation portion 12 calculates how much the print job will be completed by the timing of giving an instruction to perform maintenance of the image forming apparatus 3. Then, the adjustment portion 11 determines, based on the calculation result of the calculation portion 12, whether or not the print job is completed by the predetermined ratio or more by the timing of giving an instruction to perform maintenance of the image forming apparatus 3. When a negative determination (No) is made in step S15, that is, when the print job is completed by less than the predetermined ratio by the timing of giving an instruction to perform maintenance of the image forming apparatus 3, the process proceeds to step S16. On the other hand, when a positive determination (Yes) is made in step S15, that is, when the print job is completed by the predetermined ratio or more by the timing of giving an instruction to perform maintenance of the image forming apparatus 3, the process proceeds to step S19.

In step S16, the adjustment portion 11 advances the timing of giving an instruction to perform maintenance of the image forming apparatus 3 to give priority to, for example, the maintenance of the image forming apparatus 3 over the formation of the image on the sheet.

In step S17, the control portion 10 controls the communication portion 15 to transmit an instruction to perform maintenance of the image forming apparatus 3 to the image forming apparatus 3. As a result, the communication portion 15 transmits an instruction to perform maintenance of the image forming apparatus 3 to the image forming apparatus 3.

In step S18, in response to the completion of maintenance of the image forming apparatus 3, the user of the image forming apparatus 3 transmits a notice of completion of maintenance of the image forming apparatus 3 to the server 1 via the communication portion 32. As a result, the communication portion 15 of the server 1 receives the notice of completion of maintenance of the image forming apparatus 3. Then, the process proceeds to step S21 in FIG. 4.

In step S19, the adjustment portion 11 delays the timing of giving an instruction to perform maintenance of the image forming apparatus 3 to give priority to, for example, the formation of the image on the sheet over the maintenance of the image forming apparatus 3. Then, the process proceeds to step S21 in FIG. 4.

Embodiments of the present disclosure are described above with reference to the drawings. However, the present disclosure is not limited to the above-described embodiments, and can be implemented in various modes without departing from the gist thereof. In the drawings, the constituent elements are mainly shown schematically for the sake of easy understanding, and the thickness, length, number, and the like of each constituent element shown in the drawings differ from the actual ones for the convenience of preparation of the drawings. In addition, the shapes, dimensions, and the like of the constituent elements shown in the above embodiments are merely examples and are not particularly limited, and various changes can be made within a range that does not substantially depart from the effects of the present disclosure.

(1) As described with reference to FIG. 1, the server 1 is an example of the "schedule adjustment apparatus". However, the computer 2 or the image forming apparatus 3 may be the "schedule adjustment apparatus" as long as the computer 2 or the image forming apparatus 3 includes an adjustment portion that adjusts the maintenance schedule of the image forming apparatus, a storage portion that stores the schedule, and a communication portion that acquires state information SI from the image forming apparatus 3.

(2) The order of step S1 to step S31 in FIG. 3 and FIG. 4 and the order of step S11 to step S31 in FIG. 4 and FIG. 5 can be changed as appropriate.

(3) As described with reference to FIG. 1 and FIG. 4, the image formed on a sheet by the image forming portion 31 executing a print job is analyzed by the detection device 34. However, the detection device 34 may scan and analyze a maintenance chart formed on the sheet by the image forming portion 31. In this case, the detection device 34 generates an adjustment value of the image forming portion 31 based on the analysis result. The user performs maintenance of the image forming apparatus 3 based on the adjustment value, for example.

(4) As described with reference to FIG. 1 and FIG. 2, the storage portion 14 of the server 1 stores the schedule SC for giving an instruction to perform maintenance of the image forming apparatus 3. However, the storage portion 14 may store the schedule SC for each kind of maintenance of the image forming apparatus 3. For example, the storage portion 14 may store a schedule SC for giving an instruction to perform drive voltage adjustment, a schedule for giving an instruction to perform non-discharge nozzle correction, a schedule for giving an instruction to perform purging, and a schedule for giving an instruction to perform belt meandering correction.

The present disclosure is applicable to the field of schedule adjustment apparatuses and image forming systems and has industrial applicability.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A schedule adjustment apparatus comprising:
a storage portion for storing a schedule for giving an instruction to perform maintenance of an image forming apparatus;
an acquisition portion for acquiring, from the image forming apparatus, state information indicating a state of an image formed on a sheet by the image forming apparatus;
an adjustment portion for adjusting the schedule based on the state information;
a calculation portion for calculating a time period during which the image forming apparatus forms the image on the sheet; and
a determination portion for determining, based on a result of the calculation by the calculation portion, whether or not the time period during which the image forming apparatus forms the image on the sheet overlaps with a timing of the instruction.

2. The schedule adjustment apparatus according to claim 1, wherein
the state information includes abnormality information indicating that the image is abnormal or normality information indicating that the image is normal, and
the adjustment portion
advances or maintains the timing of the instruction when the state information includes the abnormality information, and
delays or maintains the timing of the instruction when the state information includes the normality information.

3. The schedule adjustment apparatus according to claim 1, comprising:
a transmission portion for transmitting a result of the determination by the determination portion to the image forming apparatus, wherein
the acquisition portion acquires a user's instruction based on the result of the determination, and
the adjustment portion further adjusts the schedule based on the user's instruction.

4. The schedule adjustment apparatus according to claim 1, wherein the adjustment portion adjusts the schedule when the determination portion determines that the time period during which the image forming apparatus forms the image on the sheet overlaps with the timing of the instruction.

5. The schedule adjustment apparatus according to claim 1, wherein the adjustment portion adjusts the schedule in accordance with a use situation of the image forming apparatus.

6. An image forming system comprising an image forming apparatus and a schedule adjustment apparatus, wherein
the image forming apparatus includes:
an image forming portion for forming an image on a sheet;
a state detection portion for detecting a state of the image formed on the sheet and generating state information indicating the state of the image; and
a transmission portion for transmitting the state information to the schedule adjustment apparatus, and
the schedule adjustment apparatus includes:
a storage portion for storing a schedule for giving an instruction to perform maintenance of the image forming apparatus;
an acquisition portion for acquiring the state information from the image forming apparatus;
an adjustment portion for adjusting the schedule based on the state information;
a calculation portion for calculating a time period during which the image forming apparatus forms the image on the sheet; and
a determination portion for determining, based on a result of the calculation by the calculation portion, whether or not the time period during which the image forming apparatus forms the image on the sheet overlaps with a timing of the instruction.

\* \* \* \* \*